United States Patent
Stone et al.

[11] Patent Number: 5,818,455
[45] Date of Patent: Oct. 6, 1998

[54] METHOD AND APPARATUS FOR OPERATING ON THE MODEL DATA STRUCTURE OF AN IMAGE TO PRODUCE HUMAN PERCEPTIBLE OUTPUT USING A VIEWING OPERATION REGION HAVING EXPLICIT MULTIPLE REGIONS

[75] Inventors: Maureen C. Stone, Los Altos; Kenneth P. Fishkin, Redwood City; Eric A. Bier, Mountain View, all of Calif.

[73] Assignee: Xerox Corporation, Stamford, Conn.

[21] Appl. No.: 429,376

[22] Filed: Apr. 26, 1995

Related U.S. Application Data

[63] Continuation-in-part of Ser. No. 320,975, Oct. 6, 1994, Pat. No. 5,467,441, which is a continuation of Ser. No. 96,131, Jul. 21, 1993, abandoned.

[51] Int. Cl.$^6$ ................................................. G06F 15/62
[52] U.S. Cl. ............................................................. 345/433
[58] Field of Search .................................... 395/133, 135, 395/141, 138, 129, 139, 128; 345/130, 131

[56] References Cited

U.S. PATENT DOCUMENTS

| | | | |
|---|---|---|---|
| 4,800,379 | 1/1989 | Yeomans | 340/731 |
| 5,283,560 | 2/1994 | Bartlett | 345/113 |
| 5,329,613 | 7/1994 | Brase et al. | 345/422 |
| 5,341,466 | 8/1994 | Perlin et al. | 345/439 |
| 5,426,729 | 6/1995 | Parker | 345/441 |
| 5,467,441 | 11/1995 | Stone et al. | 345/433 |
| 5,471,578 | 11/1995 | Moran et al. | 345/358 |
| 5,479,603 | 12/1995 | Stone et al. | 345/326 |
| 5,481,653 | 1/1996 | Kashiwagi et al. | 345/418 |
| 5,485,174 | 1/1996 | Henshaw et al. | 345/123 |

FOREIGN PATENT DOCUMENTS 0 544 509 A2  11/1992  European Pat. Off. .

OTHER PUBLICATIONS

Loughlin et al., "An annotation system for 3D fluid flow visualization", Visualization, 1994 Conference, IEEE, 1994.
Simone, "CorelDRAW 5: working on synergy", PC Magazine, v13, n14, p. 35, Aug. 1994.
Clark, "Complete package for modelling: Integraph MicroStation 5.0", PC User n233, p. 71, Apr. 20, 1994.

(List continued on next page.)

Primary Examiner—Anton Fetting
Attorney, Agent, or Firm—Fay, Sharpe, Beall, Fagan, Minnich & McKee

[57] ABSTRACT

A method of operating a processor control machine, and a machine having a processor for producing human perceptible output related to an image display feature presented in an original image using the model data structure (the model) from which the original image was produced. In response to the display of an output producing region displayed coextensively with the first image segment including a display feature representing a data item in the model, a human perceptible output is produced using the data item. This is done at the same time as the first image is being displayed, giving the perception to a machine user of providing information related to the display feature in the first segment. The human perceptible output is a second image displayed by the output producing region, called a viewing operation region, or VOR. The VOR consists of one or more explicit input regions and one or more explicit output regions, spatially separated from the one or more input regions. The VOR, nevertheless, functions to bind or link the second view in the output region to the original image associated with the input region.

16 Claims, 13 Drawing Sheets

OTHER PUBLICATIONS

McClelland, "FreeHand vs. Illustrator: the two top PostScript draw programs face off", Macworld, v. 11, n. 6, p. 132, Jun. 1994.

Kai's Power Tools for Windows (v. 2.0), Data Sources Report, Ziff Communications Co., 1994.

Earnshaw et al., ed., "Animation and Scientific Visualization: Tools & Applications," Academic Press, 1993, p. 16, and Plate 74–75, 1993.

Advances in Instrumentation and Control 47 (1992) Part 2, Research Triangle Park, NC, US, "Interface in the 1990's", by Charles Ottino.

Computer Graphics Proceedings, Annual Conference Series, 1993, "Toolglass and Magic Lenses: The See–Through Interface", by Eric A. Bier, et al.

CHI '89 Proceedings, "the Tourist Artificial Reality", by Kim Fairchild, et al.

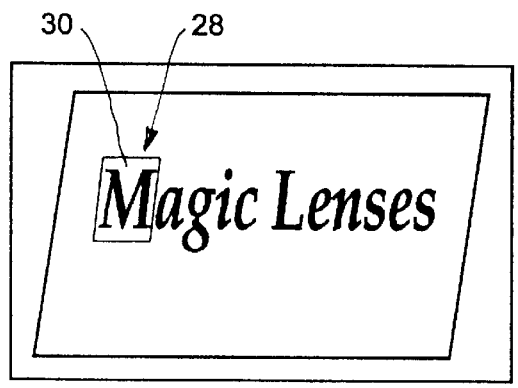
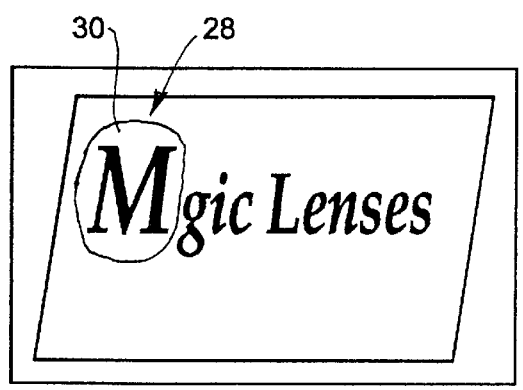
FIG. 2A    FIG. 2B
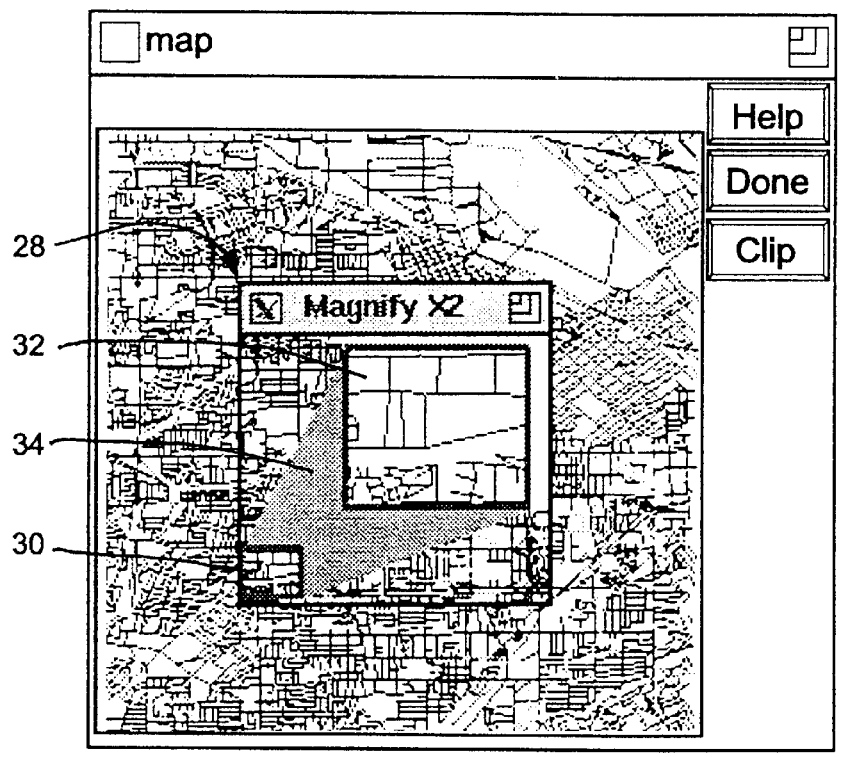
FIG. 3

METHOD AND APPARATUS FOR OPERATING ON THE MODEL DATA STRUCTURE OF AN IMAGE TO PRODUCE HUMAN PERCEPTIBLE OUTPUT USING A VIEWING OPERATION REGION HAVING EXPLICIT MULTIPLE REGIONS

This is a continuation-in-part of application Ser. No. 08/320,975, filed Oct. 6, 1994, now U.S. Pat. No. 5,467,441, which is a continuation of U.S. Ser. No. 08/096,131, filed Jul. 21, 1993, now abandoned.

CROSS REFERENCE TO OTHER APPLICATIONS

The present invention is related to other inventions that are the subject matter of concurrently filed, commonly assigned U.S. patent applications having the following serial numbers and titles: Ser. No. 08/096,521, now U.S. Pat. No. 5,652,851, User Interface Technique for Producing a Second Image in the Spacial Context of a First Image Using a Model-Based Operation, which is hereby incorporated by reference herein; Ser. No. 08/096,200, now U.S. Pat. No. 5,596,690, "Method and Apparatus for Operating on an Object-Based Model Data Structure to Produce a Second Image in the Spacial Context of a First Image"; Ser. No. 08/096,193, now U.S. Pat. No. 5,479,603, "Method and Apparatus for Producing a Composite Second Image in the Spatial Context of a First Image", which is hereby incorporated by reference herein; Ser. No. 08/095,974, "User-Directed Method for Operating on an Object-Based Model Data Structure Through a Second Contextual Image"; and Ser. No. 08/320,975, now U.S. Pat. No. 5,467,441, "Method for Operating on Objects in a First Image Using an Object-Based Model Data Structure to Produce a Second Contextual Image having Added, Replaced, or Deleted Objects".

FIELD OF THE INVENTION

The present invention relates generally to a method of operating a processor-controlled machine having a display for displaying images, and to a processor-controlled machine operated according to the method. More particularly, the present invention relates to producing a human perceptible output related to the image display features presented in a first displayed image by operating on the model data structure from which the first displayed image was produced. At least one distinct input region is provided and located coextensive with the first displayed image, and at least one distinct output region is provided spatially separate from but in some manner linked to the input region, the output region being used to display the human perceptible output.

BACKGROUND

A frequent and powerful use of a processor-controlled machine such as a computer is the presentation of information in the form of images on a display device connected to the machine. An image, which may include characters, words, and text as well as other display features such as graphics, is produced in a display area of the display device directly from an image definition data structure defining the image; the image definition data structure is typically stored in a memory area of the machine. One type of image format known as a raster image is composed of individual image locations commonly referred to as "pixels". The discussion of images herein will generally reference pixel data, but it is to be understood that other data formats, such as vector data, may also be used to define an image. The images discussed herein may be either static (having the appearance to a system operator or user of not moving), or animated, as, for example, in the case of a digital video image.

An image definition data structure alone carries relatively limited data about the information content of the image the data represent. However, for many images, the image definition data structure is itself generated from another data structure which contains information or data capable of being understood by a human or by a software operation such as an application program which is executed by the machine's processor. Such a data structure will be referred to herein as the "information model data structure" or the "model data structure", and is to be distinguished from the image definition data structure. Examples of information model data structures include scene description models used by rendering operations to produce graphic images such as photorealistic scenes; document models used by a word processing or other document manipulation application which contains the text, formatting instructions, and other data needed for producing a formatted document; graphical object data structures used by illustration and painting software programs; spreadsheet model data structures used by spreadsheet application programs for presenting spreadsheet images; and numerous application-specific models, such as those used for computer-aided engineering, simulation and manufacturing applications.

In some systems providing user access to the model data structure, a user may be able to access, and perhaps affect or manipulate, data and information that is not represented by display features currently visible in the original image by producing, through alternate functions defined by the application, a second or alternate view of an original displayed image. The second view may provide enhanced information about the model data structure, or the system may then permit interaction with data in the model through the display features present in the second view.

Typical of many of the systems implementing these types of multiple views of a model, the spatial relationship between the original image, the specification of the input content for the second image and the position of the second image in the display is not easy to visualize. While the specification of the input may be directly related to the first image (i.e., when the user can point to or select a region in the first image) this is not always the case as, for example, when the user has to type commands to specify a second image. Furthermore, once a selection is specified, the user either has no control over the location of the second image, or must reposition it in a separate step. Therefore, it can be difficult to understand how the second image is spatially related to the first image and to the model. Linking direct selection in the first image to the spatial position of the second image can make these relationships more clear. This can be especially important when the model is complex and can be viewed in many different ways. As systems supporting complex models, or sets of related models, are becoming more common, this problem is becoming more critical.

An example of providing a user with simultaneous control over both first image portion selection and second image display location is a software implementation of magnification as disclosed in U.S. Pat. No. 4,800,379. Another example of the display of a second image in the spatial context of a first image is disclosed in EPO 0 544 509, entitled "Photographic Filter Metaphor for Control of Digital Image Processing Software".

Operations on the image pixel data structure alone, such as those disclosed in U.S. Pat. No. 4,800,379 and EPO 0 544 509, however, provide versions and views of the first image which are limited strictly to manipulations of pixel values. So, while a typical software implementation of a pixel magnifier provides some desirable features for generating the simultaneous display of two images, the range of information content possible in the second image which is derived directly from the image pixel data structure of the first image is necessarily limited to versions and views of the first image which result only from operating on the pixel values. When information about the first image is available from the information model data structure of the first image, the methods used for operating on the image pixel data structure to produce image (pixel) magnification are not transferable to operating on the information model data structure to provide alternate views of the first image. As a result, such methods are inoperable for use in accessing alternative views of an information model data structure, or for producing a composite second image in the spatial context of a first image.

Copending, concurrently filed, commonly assigned U.S. patent applications Ser. No. 08/096,521, "Method and Apparatus for Using the Model Data Structure of an Image to Produce Human Perceptible Output in the Context of the Image" and Ser. No. 08/096,200, "Method and Apparatus for Using an Object-Based Model Data Structure to Produce a Second Image in the Spatial Context of a First Image" solve this problem of providing a second view of an original image in the spatial context of the original image by providing methods for operating a processor-controlled machine that operate on a model data structure from which a first image has been produced in order to produce a second image for display in the spatial context of the first image.

In these applications a viewing operation region (VOR) is displayed coextensively with a first image segment of the first image in the display area of the machine's display device. The first image segment includes a display feature representing a model data item in the model data structure. In response to the display of the VOR, the method operates on the model data item in the model data structure to produce a second image for display in the VOR showing information related to the display feature in the original image.

The above referenced and incorporated applications (i.e. 08/096,521, 08/096,200, 08/096,193, 08/095,974 and 08/320,975) define a "viewing operation region" (VOR), (also referred to as "output producing region") as a region having an arbitrarily shaped, bounded area. A viewing operation region is described as an example of a "workspace", and a "workspace" is defined as a display region within which display features appear to have respective relative positions. Presenting a workspace that includes plural display features produces human perceptions of the display features in respective positions relative to each other. A "window" is given as an example of a workspace.

The viewing operation region (VOR) of the referenced applications may also be called a "lens". A lens can have various attributes such as "magnification" capabilities, "x-ray" capabilities, "dashed line" capabilities, etc. The VOR or lens has an input region located coextensively with a position of a first image segment which is to be acted upon.

An output region of the VOR or lens has been described as being configured in the same area as the input region. The rendered second image is defined to have size and shape dimensions "substantially identical" to size and shape dimensions of the VOR or lens. The second image is presented in the VOR or lens substantially at the same time as the first image is being displayed in the display area. Since the VOR or lens is located in a position in the display area coextensive with the position of the first image segment, presentation of the second image in the viewing operation region replaces the first image segment in the display area.

A method according to the cited applications is described in FIG. 1A according to designated method 10 and illustrated in FIGS. 1B and 1C. It is to be appreciated that method 10 is provided as an illustration and other methods may also be used in connection with the subject invention, such as those further disclosed in co-pending Ser. No. 08/096,521, which has been incorporated by reference.

In FIG. 1B first image 20 in a display area 22 includes figures "x" and "o" in black, solid (or unbroken) lines. The figure "x" is labeled as displayed feature 24, and the figure "o" is labeled as displayed feature 26. A display feature attribute data item included in the first image model data structure has a present attribute value of "solid" giving both figures (i.e. "x" and "o") their solid outlines. The first image model data structure is discussed in detail in U.S. Ser. No. 08/096,521 incorporated by reference, see Figure 6 of that application and the associated discussion.

As set forth in box 12 of FIG. 1A, a request is received to display VOR 28 in a present viewing position in display area 22 coextensive with the present image position of a first image segment of first image 20. The first image segment includes first display feature 24 and display feature 26. In response to the display request, the method includes, as stated in box 14 of FIG. 1A, obtaining a new attribute value for the display feature attribute data item. The new attribute value indicates a modified first display feature. Particularly, a display feature having dashes or dots. In response to this request, a second image is produced having size and shape dimensions substantially identical to the size and shape dimensions of the viewing operation region (see FIG. 1A, box 16). The result of the processing produces the presentation of a second image including the modified first display feature in VOR 28. VOR 28 replaces the first image segment in the display area (FIG. 1A, box 18). In FIGS. 1B and 1C, the input region of the VOR and the output region are substantially identical in size.

FIG. 1C graphically sets forth the results of this method which produces a second image in place of the solid outline figures "x" and "o" originally produced in the first image segment. Figures "x" and "o" each have the new attribute value indicating a "broken" line.

As this example illustrates, since the second image is in the same area as the first image segment, the first image segment is obliterated. Further, when a VOR, such as a "magnification" VOR, which has an output region larger than its input region is used, material adjacent to the first image segment can also be obliterated, thereby covering up material which may be pertinent to a user.

SUMMARY OF THE INVENTION

The subject application extends the invention set forth in the previously cited applications. In those applications a method and apparatus was described which included the use of viewing operation regions (VOR) as tools for visualization and interaction consisting of a movable, arbitrarily shaped region and an arbitrary filter. Positioning a VOR over a rendering of some model provides an alternative view of the model inside the region of the VOR. The basic concepts of VORs have been disclosed in U.S. Ser. Nos. 08/096,521, 08/096,200, 08/096,193, 08/095,974, 08/320,975. These applications describe in detail VORs with a single explicitly manipulable region. They also include descriptions of VORs that have different sized regions. For example, a "magnification" VOR, will have an input region smaller than the output region. Another example of this is when a VOR provides a definition for words in a text document; the definition will take up much more space than the word. Application Ser. No. 08/096,193 discloses combinations of VORs called composition VORs. It is to be appreciated that the teachings of this application extends to these VORs.

As generally noted above, when a generated output region is larger than the input region, in addition to the first image segment being obliterated, information in proximity to the first image segment may also be lost. FIGS. 2A–2B illustrates this situation. The magnified image "M" in input region 30 of VOR 28 has an output region 32 (FIG. 2B) larger than input region 30, therefore detail outside of the input region is lost (i.e., the letter "a" cannot be seen in FIG. 2B). In some instances, this information is of particular importance to a user. In consideration of this, a manner in which such information can be maintained would be very desirable.

The inventors of the subject invention have determined that this problem may be solved by designing VORs having explicit multiple regions. The VORs according to the subject invention include at least one explicit input region and at least one visually separated explicit output region. The at least one input region and at least one output region are visually or in some other manner linked, such that a user is able to determine the connection between the regions.

BRIEF DESCRIPTION OF THE DRAWINGS

FIGS. 2A and 2B illustrate a "magnification" VOR with an output region larger than an input region;

FIG. 3 illustrates VOR with an explicit input region and a spatially separate explicit output region;

DETAILED DESCRIPTION OF THE PREFERRED EMBODIMENT

A viewing operation region (VOR) 28 with an explicit input region 30 and an explicit output region 32 is illustrated in FIG. 3. In FIG. 3 the output region 32 is visually separated from the input region 30. A visual connection between these regions is achieved by using a shaded area 34 to visually link the input region and output region. While the shaded area provides a visual link between the regions, it does not hide the information located thereunder. Rather, a user is able to view the material within shaded area 34.

Rendering of a second image in the output region 32 is accomplished in the same manner as for VORs having a single explicitly manipulable region as disclosed in the co-pending applications. However, a difference which exists is that in the construction or generation of VORs according to the subject invention, the output region is distinct (i.e., an explicit region) from the input region. This distinguishing may be accomplished by providing a predetermined distance between the regions, providing unique shapes to the regions, or in some other manner. Distancing can be achieved by providing a predetermined offset value between the input region and the output region when the VOR is constructed.

Figure 1A:
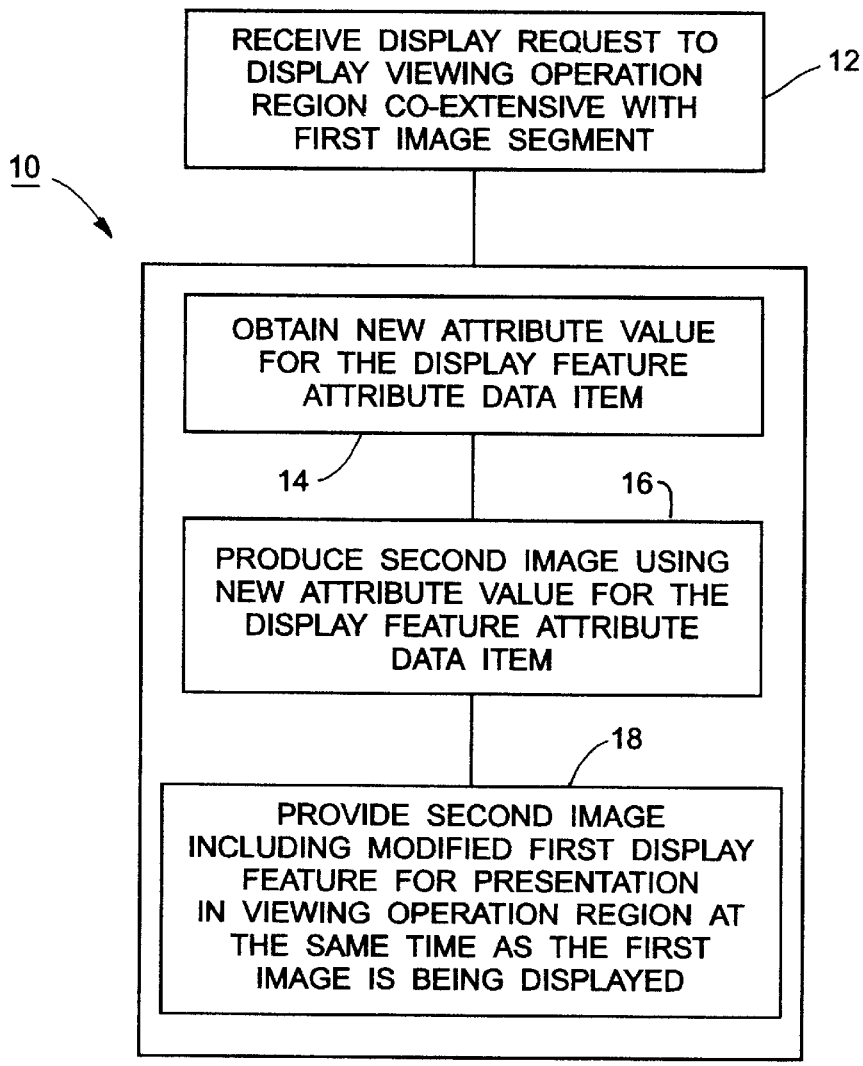
FIG. 1A is a flow chart illustrating the acts of the method of operating a machine according to the present invention, which produces image definition data defining a second image including a modified first display feature.
Figures 1B, 1C:
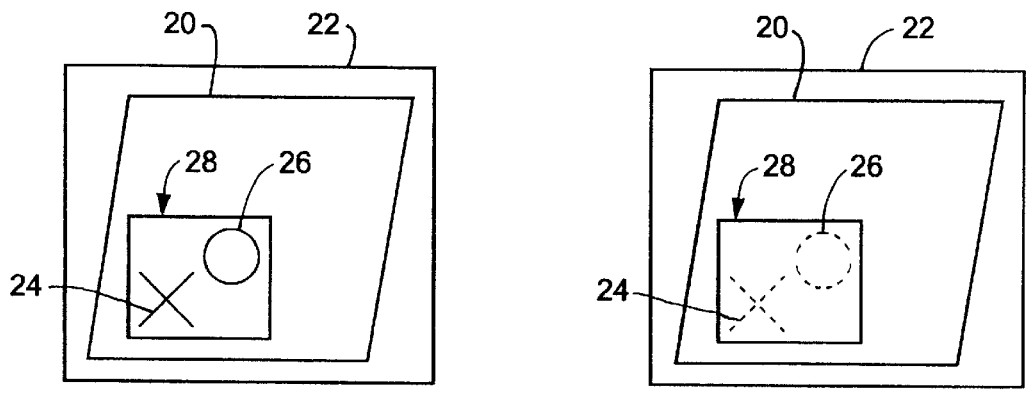
FIGS. 1B and 1C illustrate a sequence of display screens showing the first image and the second image produced according to the method illustrated in FIG. 1A.
Figure 4A:
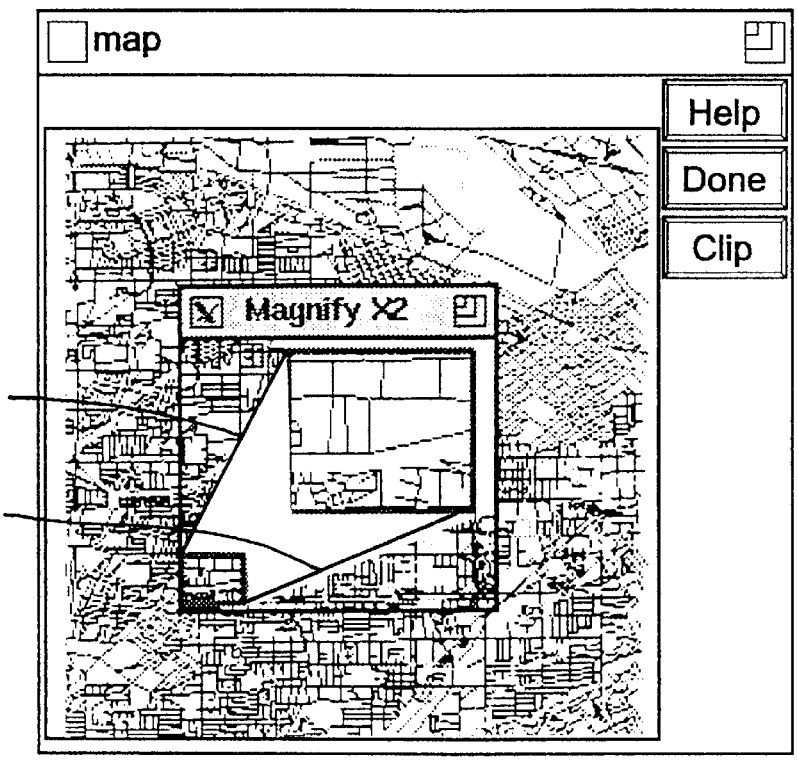
FIGS. 4A and 4B illustrate a VOR as depicted in FIG. 3, with bold lines and dashed lines replacing the shaded area.
Figure 4B:
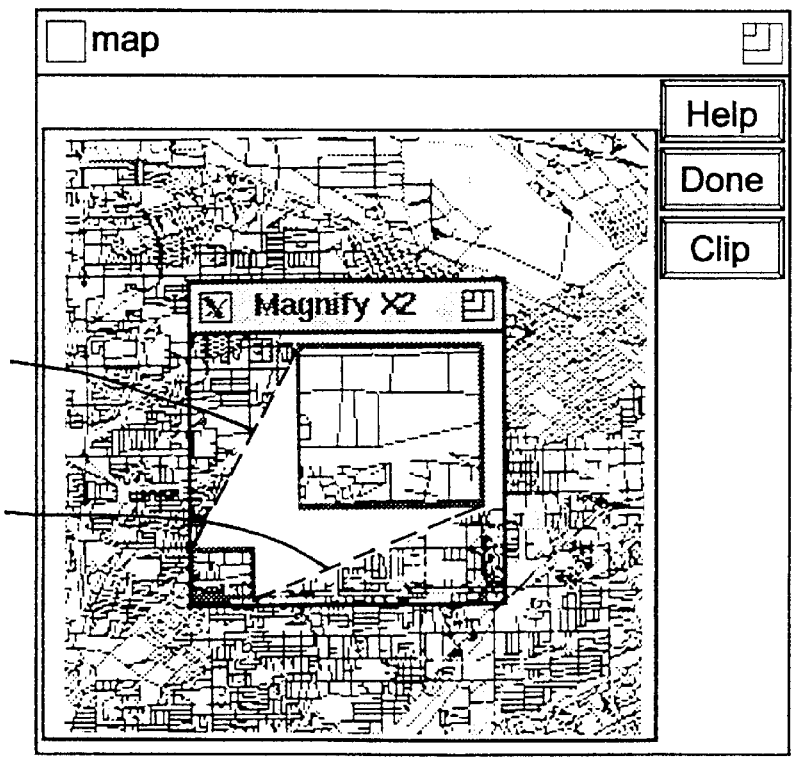

It is to be appreciated that whereas in FIG. 3 a shaded area 34 is used to visually link the input region 30 with the output region 32, other manners of showing the association or connection of the regions are possible, including, as illustrated in FIGS. 4A and 4B, replacing shaded area 34 with bold 36 or dashed 38 lines connecting the explicit regions. In addition, the lines may be displayed having a color which enhances the visual linking.

Explicit input and output regions are considered useful in many situations, including implementation in definition and translation of text, and in general, in any situation where the output region is larger than or of a different semantic type then the input region.

An issue with respect to the concept of separate explicit input and output regions is that these regions need to be linked together to allow them to move together or in some other way are linked so that a user can easily determine that they are associated with each other.

Figure 5A:
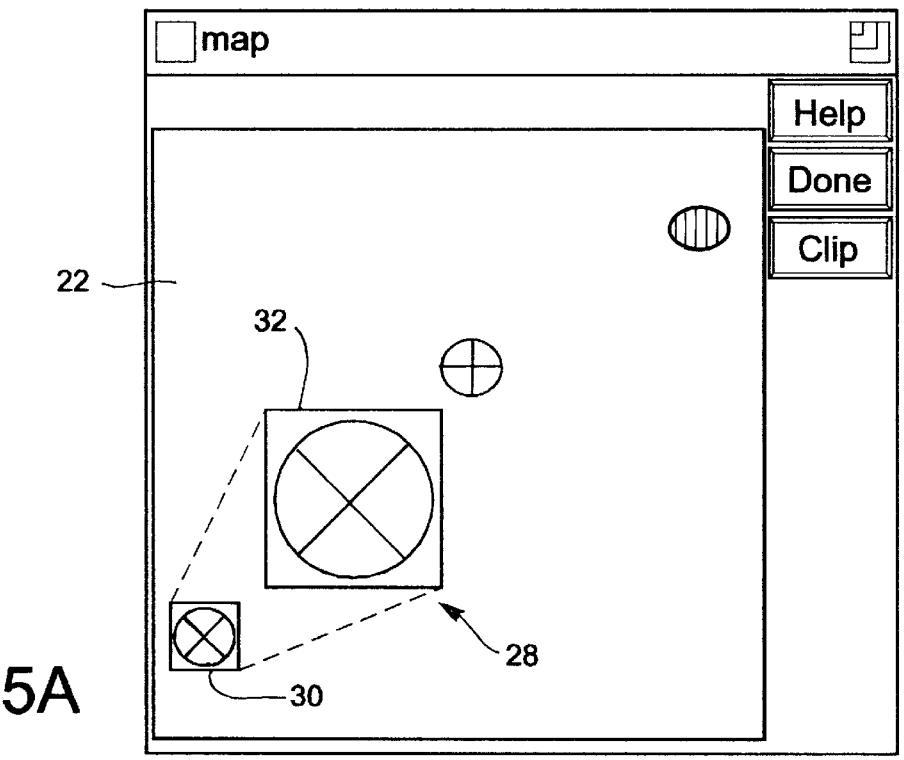
FIGS. 5A–5E illustrate a "magnification" VOR with an adjustable output region.
Figure 5B:
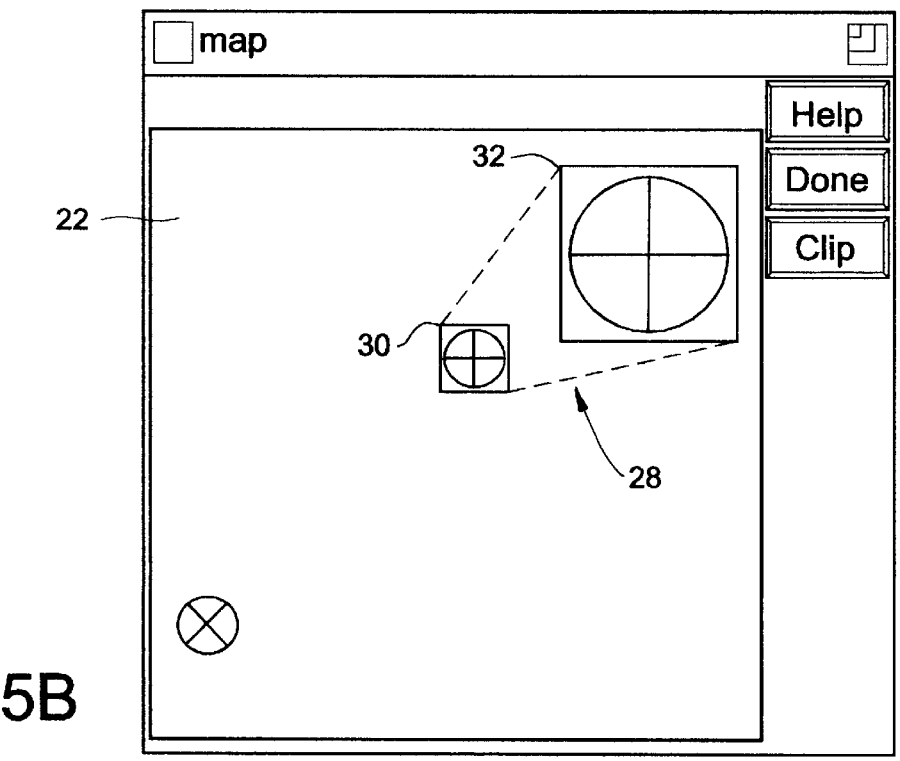

The linkage between the input and output regions does not need to be fixed or rigid. For example, with a magnification VOR 28 as depicted in FIGS. 5A–5B, as the VOR 28 is moved so the input region is placed over different images, these different images will be magnified. However, as shown in FIG. 5B, when the input region is moved towards, for example, the right-hand edge of display area 22, the output region 32 of VOR 28 will encounter the edge of display area 22, thereby not permitting observation of the area of the map on the right edge, without repositioning the map. By observation we mean both simply viewing the area of the map and making it possible to locate the input region 30 coextensive with images located in the now observable area.

Figure 5C:
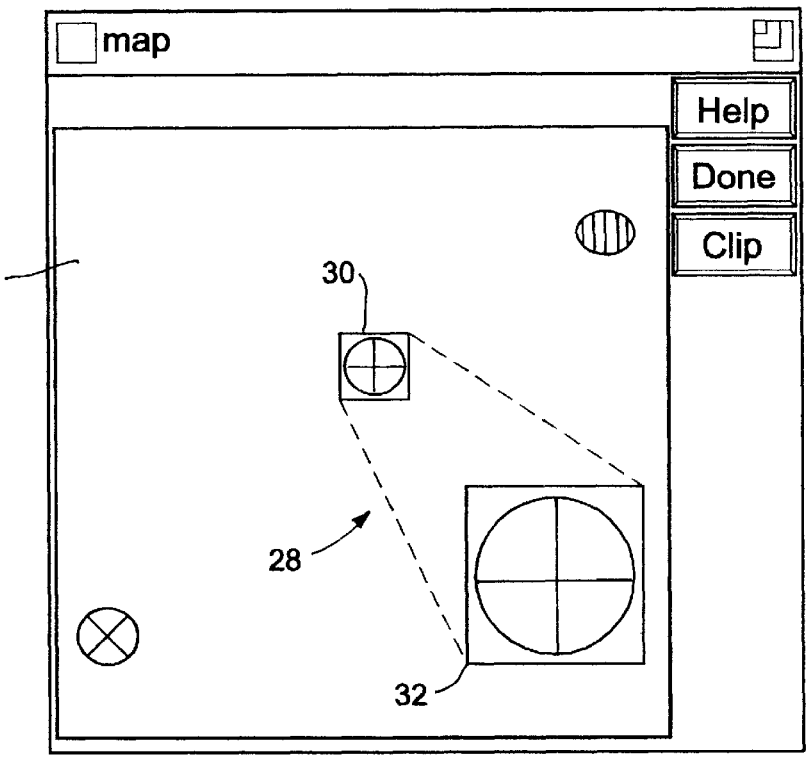
Figure 5D:
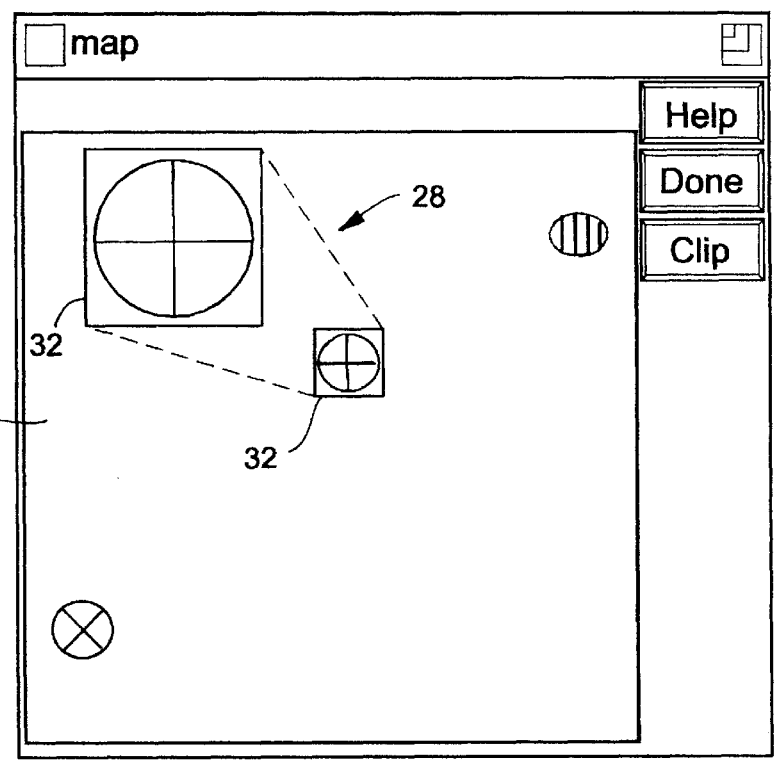
Figure 5E:
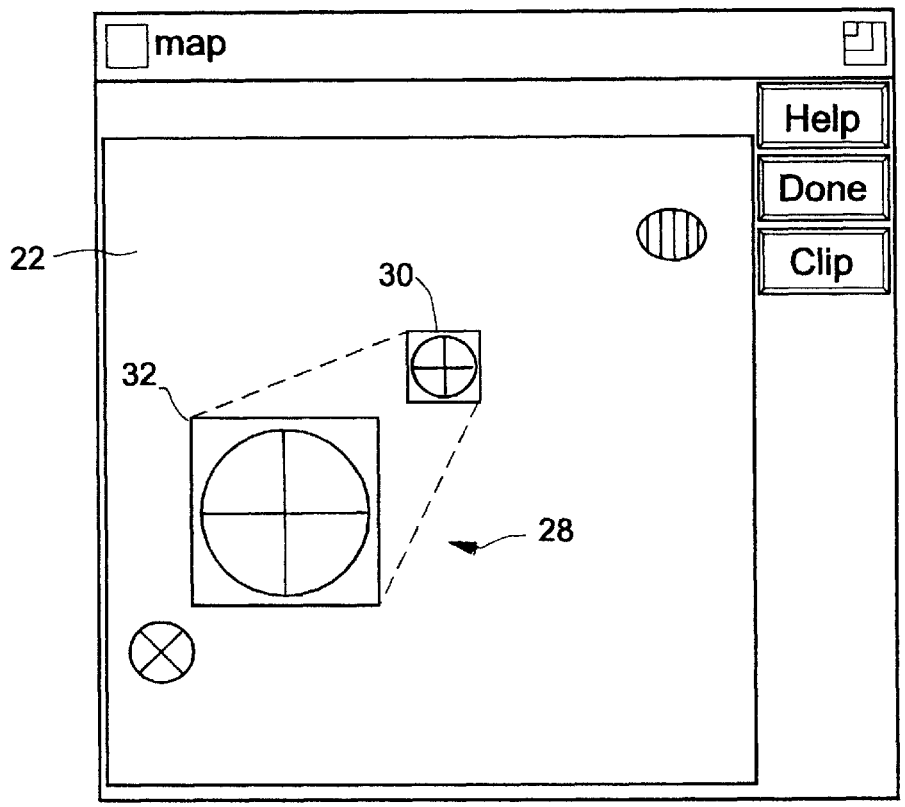

To address the above situation VOR 28 is constructed such that the spatial relationship between the input region and output region is adjustable. Particularly, as illustrated in FIGS. 5C–5E when the method senses that a section of the output region 32 is at the edge of the display area 22, new offset values replace existing offset values. The changing the offset values causes the output region 32 to adjust its spatial relationship relative to the input region 30. As FIGS. 5C–5E show, the output region 32 can be shifted, for example, to the upper left side of the input region (FIG. 5G), the lower left side of the input region (FIG. 5D) or the lower right side of the input region (FIG. 5E).

Figure 5F:
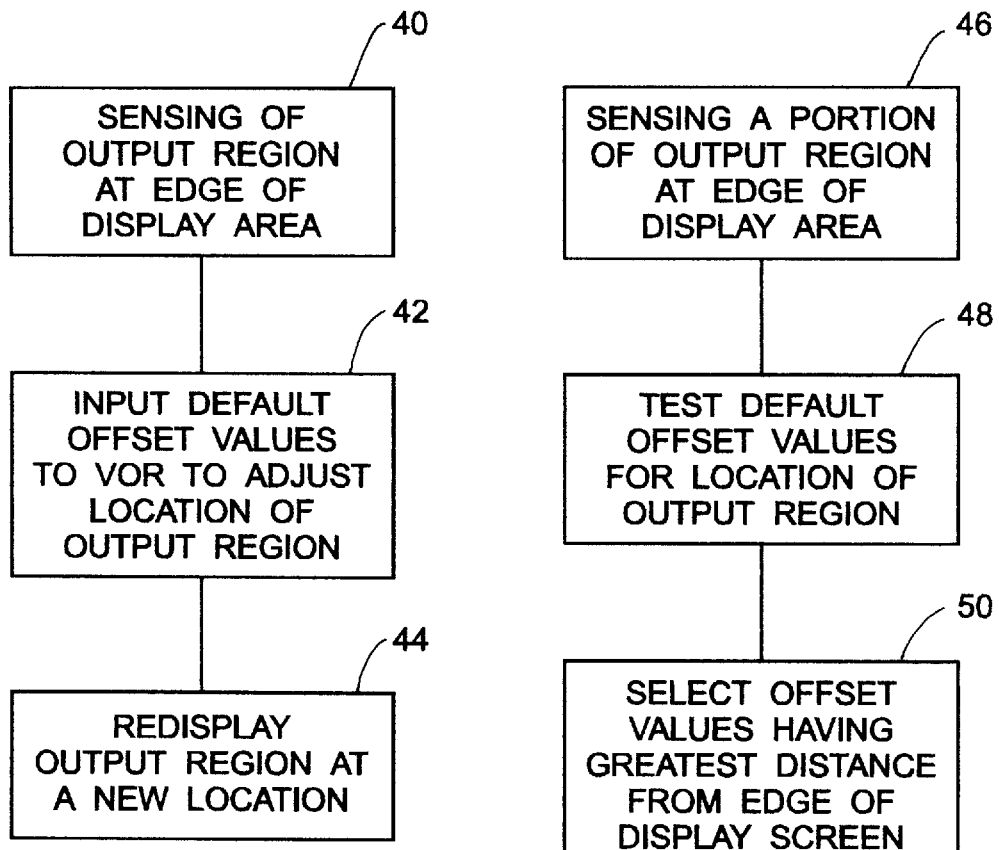
FIGS. 5F–5G are algorithms for the adjustable output region of FIGS. 5A–5E.

The adjustment of the output region can be implemented in an variety of ways. FIG. 5F provides a method of automatically providing a default position. The method includes a step 40 that senses when a portion of the output region is at the edge of display area 22. When this occurs a set of predetermined default offset values replace existing offset values, in order to adjust the output region of the VOR (step 42). In step 44 the output region is redisplayed at a new location.

Figure 5G:
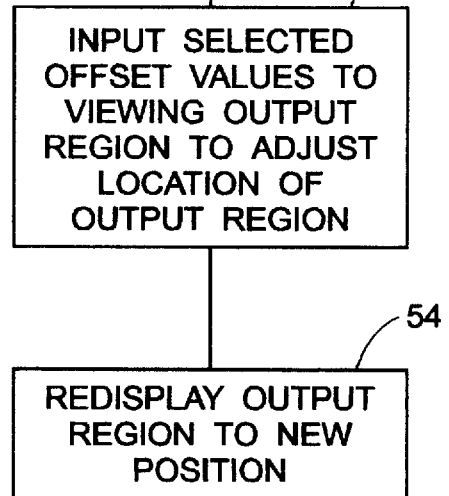

Alternatively, a method accomplished by steps 46–54 of FIG. 5G can determine which of a set of possible positions result in the greatest distance from the edge of the display area 22, and output region 32 is repositioned accordingly.

Figure 6C:
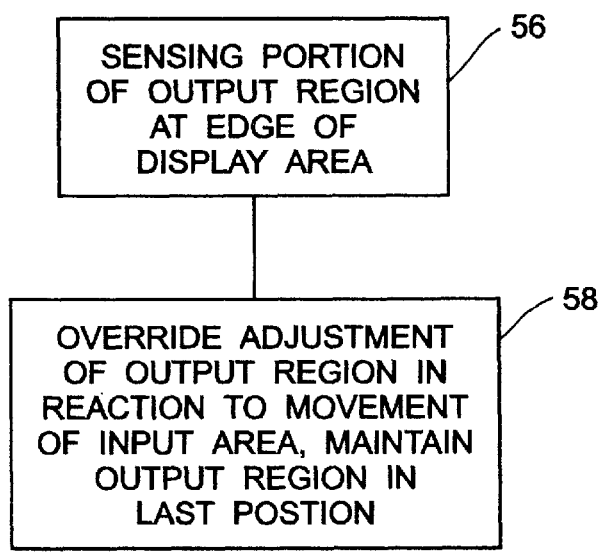
FIG. 6C is an algorithm for the output region in FIGS. 6A–6B.
Figure 6A:
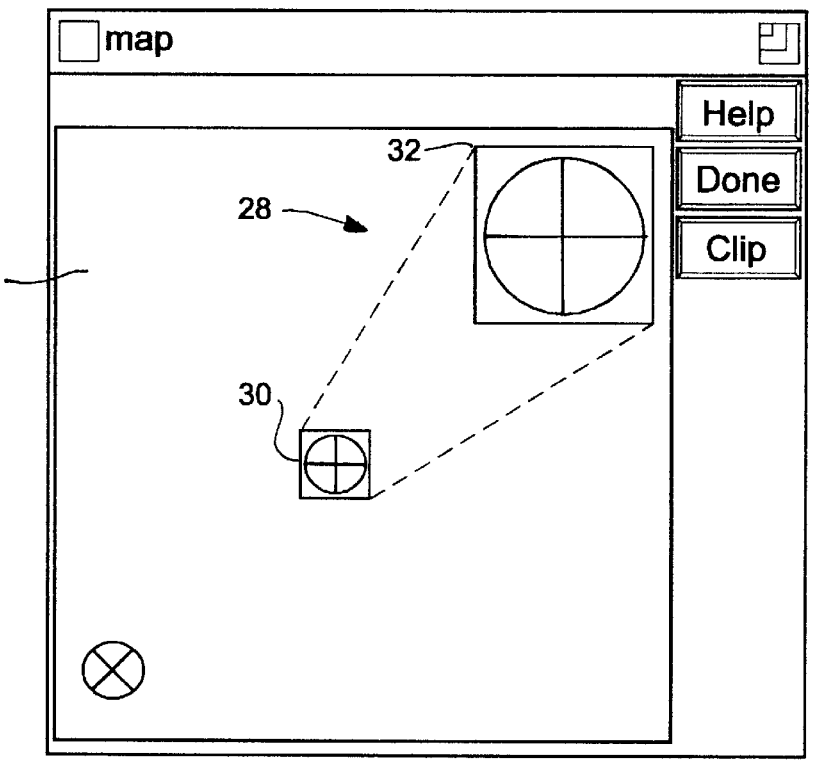
FIGS. 6A–6B illustrate an override of offset values for an output region.
Figure 6B:
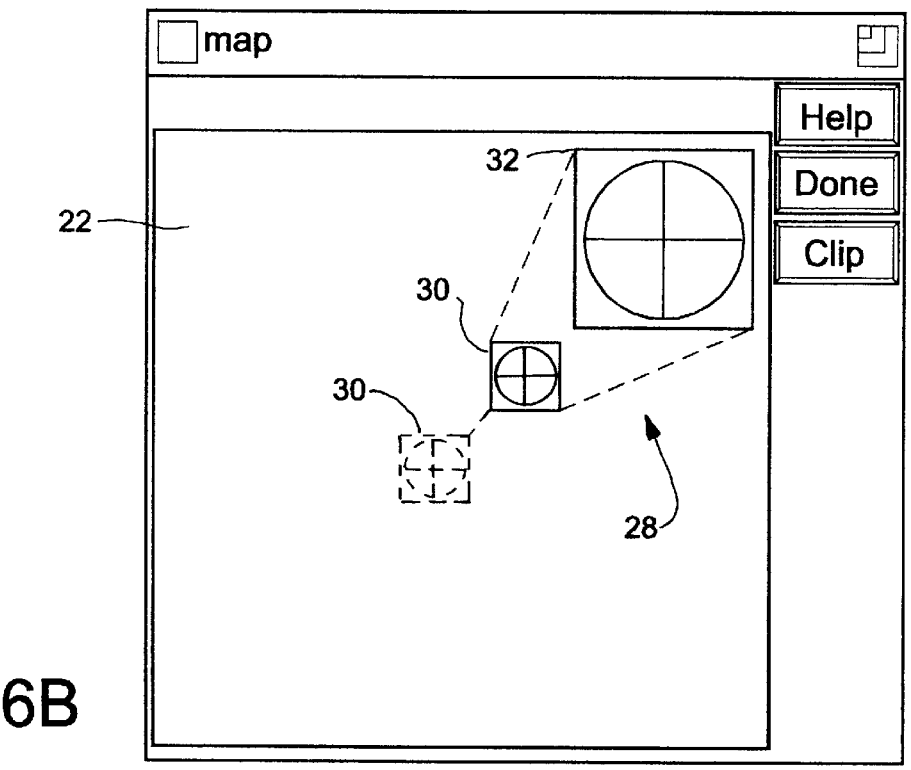

A further alternative to the above operation is illustrated by FIGS. 6A–6B, wherein upon reaching the edge of display area 22 the offset values used in configuring VOR 28 are overridden such that the output region 32 is maintained at the edge of the display area 22 as the input region 30 continues to be moved towards the right edge. In this manner, the input region 30 moves towards the output region 32. This implementation may be appropriate in situations where the portion of the map, etc. which is obliterated or hidden is not of great concern and the area which is of most interest can be obtained through the override procedure. FIG. 6C provides a method in steps 56 and 58 for accomplishing the above actions.

In a further embodiment of a VOR with explicit input and output regions, a VOR according to the subject invention may also be configured to link the explicit regions with one another without the use of direct visual connections, such as the shaded area or lines of the previous embodiments.

Figure 7A:
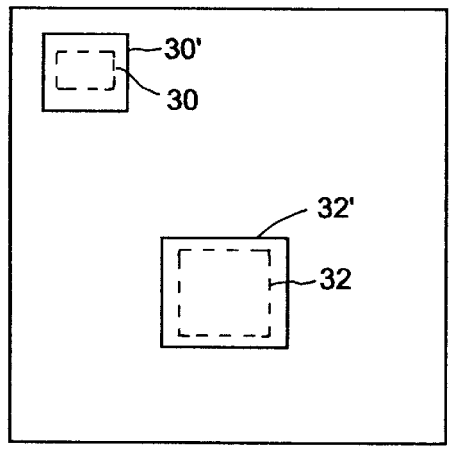
FIGS. 7A–7B are diagrams of a display with a VOR having explicit input and output regions linked by resizing characteristics of the regions.
Figure 7B:
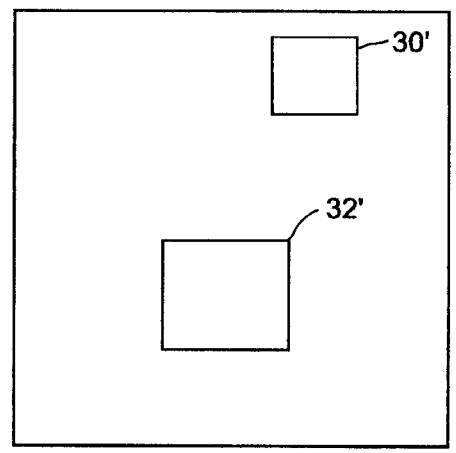

FIGS. 7A–7B illustrate an implementation of a VOR 28, having explicit input and output regions. The regions are linked in that resizing one region (e.g. 30 to 30') resizes the other region (e.g. 32 to 32'). However, moving one region (e.g. 30') does not move the other region (e.g. 32').

Figure 8A:
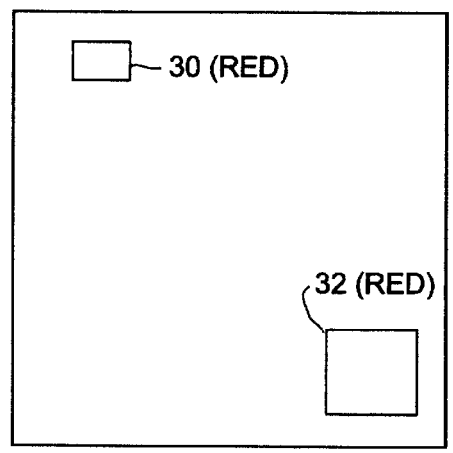
FIGS. 8A–8C set forth diagrams of a display with a VOR having explicit input and output regions linked by color coding and geometric similarities of the regions.

Another embodiment of a VOR 28 having an explicit input region and explicit output region is depicted in FIG. 8A, wherein the input region is outlined or shaded in a particular color, such as red. The red outlined or shaded input region 30 is linked with an output region 32 also outlined or shaded in red.

Figure 8B:
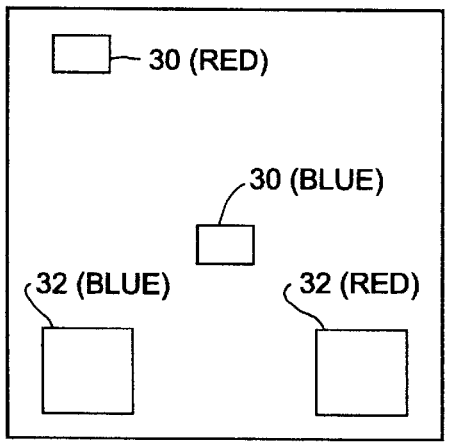
Figure 8C:
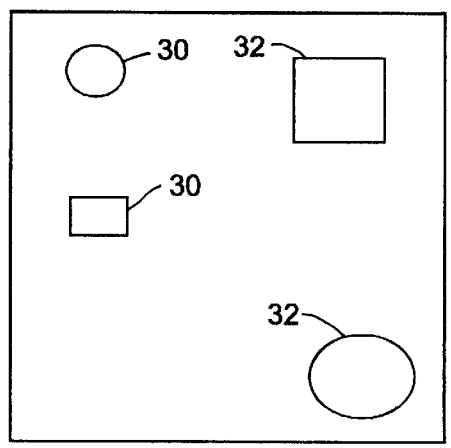

This type of linking is especially useful in situations where multiple VORs 28, 28' (FIG. 8B) are used in the same image or document. For instance, when a plurality of VORs are in use, those of the same color (e.g. red with red, blue with blue) is easily associated with each other by a user. It is to be appreciated that in place of using colors, VORs 28, 28' with explicit input and output regions, can use geometric shapes to provide visual association (FIG. 8C). As one example, a rectangular input region 30 is associated with a rectangular output region 32 whereas a circular input region 30' is associated with a similar circular output region 32'.

Figure 9A:
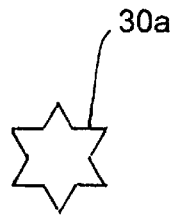
FIGS. 9A–9B provide an illustration of a VOR with a single input region and a plurality of output regions.
Figure 9B:
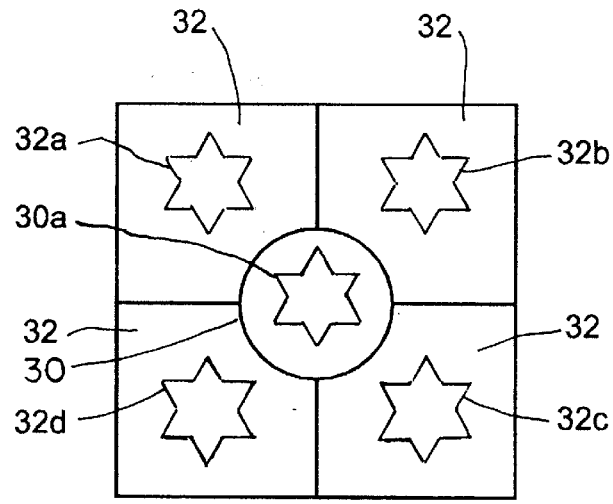

In yet another embodiment depicted in FIGS. 9A and 9B, a VOR with regions consisting of more than one shape are possible. An original image 30a of FIG. 9A, located coextensively with an input region 30 of VOR 28 having multiple output regions allows the generation of multiple output images 32a–32d, varying, for example, the percentage of color tint for each.

Figure 10:
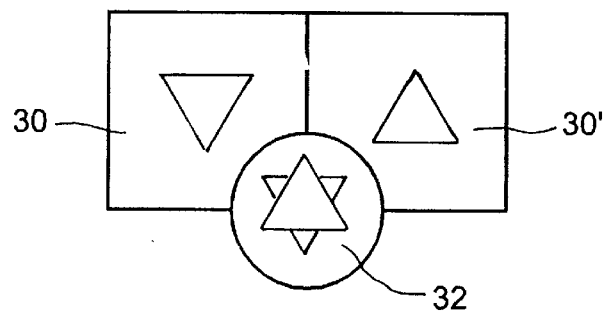
FIG. 10 illustrates a VOR embodiment which includes multiple input regions and one output region.

In a related concept, the VOR 28 in FIG. 10 illustrates an embodiment which includes multiple input regions 30, 30' wherein the results of processing in the input regions 30, 30' are combined into one output region 32, accomplished by overlapping.

Figure 11:
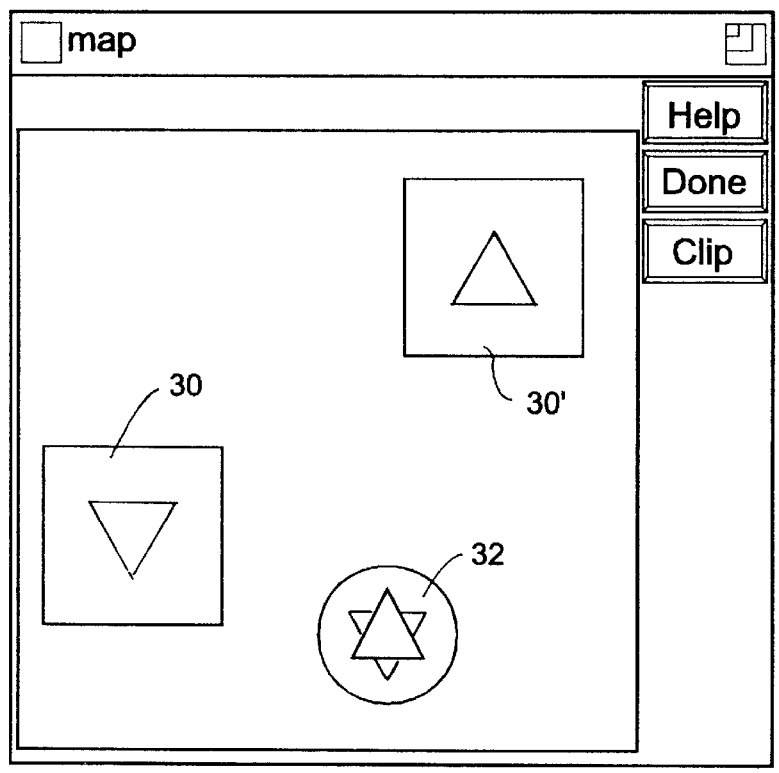
FIG. 11 provides a description of an embodiment where different regions can be moved with respect to each other.

FIG. 11, extends the concepts of the embodiment disclosed in connection with FIG. 10, providing a VOR 28 where the explicit regions can be moved with respect to each other. Particularly, in this example, all three regions may be individually positioned, the positions of the regions being under user control.

Figure 12:
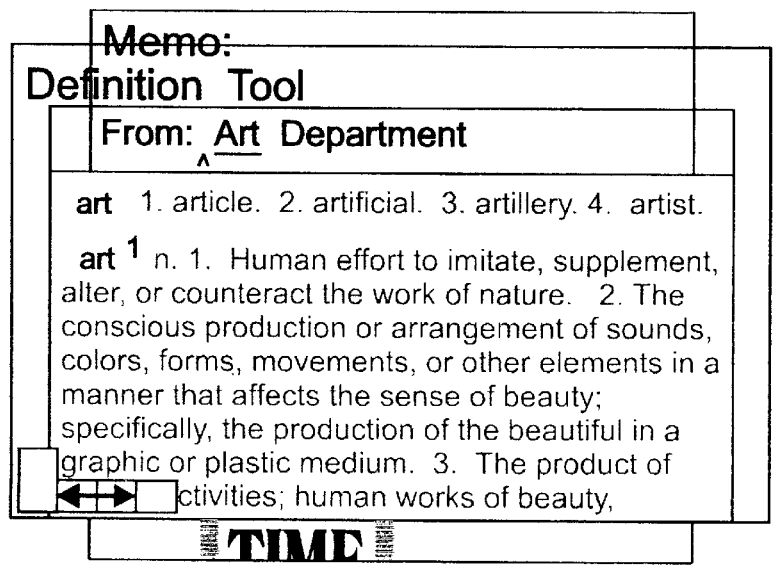
FIG. 12 depicts operation of a VOR where the input region is a line selection.

In still another embodiment of the subject invention, the input region 30 is specified by a line or point selection (FIG. 12). In the VOR of FIG. 12, the definition of a word is generated by selecting a word through the input region (i.e. the line selection) 30 of a VOR 28 with explicit regions. The user selects the word by clicking the mouse. In one design the definition does not change if the line selection of the VOR moves. Other designs for the same VOR include the use of a "hot spot" on the VOR that corresponded to the line or point selection. In this implementation, the definition continuously updates as the line or point selection is moved.

As in the co-pending applications, the linking between the input region and output region is constructed to allow for a constant tracking of the changing information in a smooth manner.

VORs according to the subject invention may have a topologically complex boundary, need not be a fixed or predetermined shape, and need not have an explicitly drawn border as long as it is perceptible as a coherent, distinguishable area. Thus, in the illustrated embodiments in which the user interacts with the VOR, the VOR must be sufficiently perceptible to allow the user to locate the VOR in the display and to attach the tracking symbol or cursor. In addition, the VOR need not be a single bounded area, but may be two or more contiguous or noncontiguous bounded areas that function together as a single bounded area would.

Figure 13:
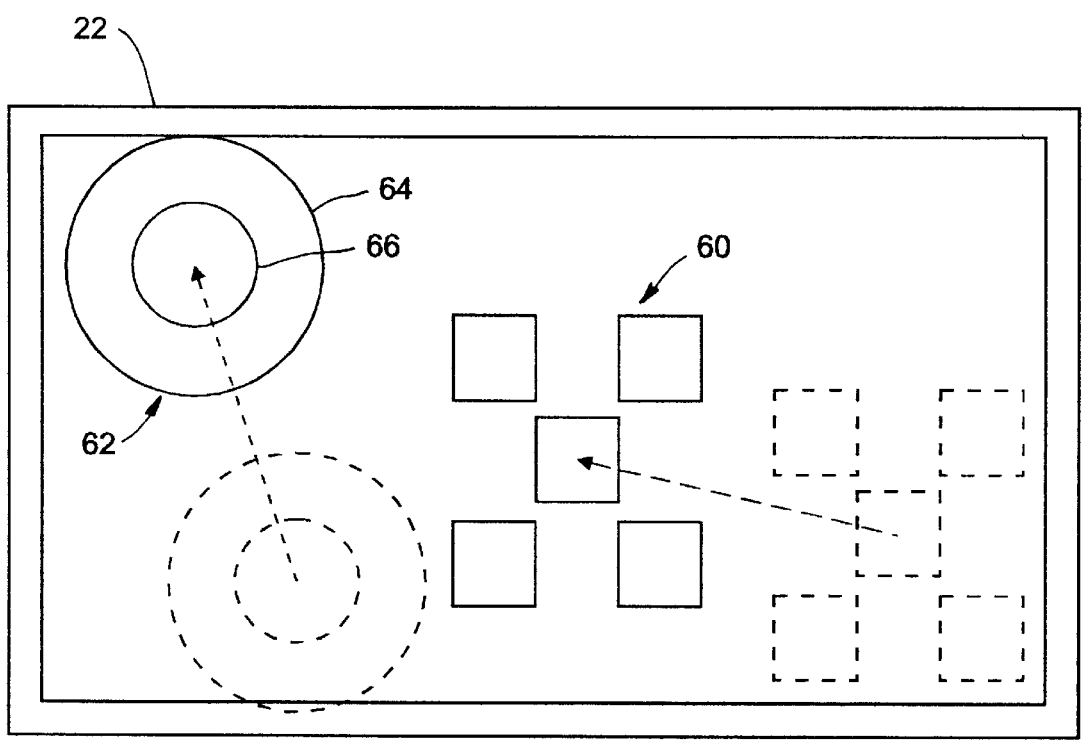
FIG. 13 is a display screen showing different configurations of a viewing operation region.

FIG. 13 shows VOR 60 and VOR 62 in display area 22 to further illustrate the variety of shapes that the VOR may have. VOR 62 is bounded by both exterior circular boundary 64 and interior circular boundary 66; the region inside boundary 66 is not included in VOR 62. VOR 60 includes five noncontiguous regions that function together as a VOR. FIG. 13 illustrates VOR 60 moving along the dotted line arrow from a first position shown in the dotted line boundary.

In the above embodiments, the VOR is implemented in a subwindow and can be manipulated like other subwindows using conventional window manipulation techniques. For example as previously discussed, the VOR can be resized by the user, and otherwise moved in any conventional manner. A mouse click can be used to select an unselected VOR, and to deselect a selected VOR.

To accommodate other useful functionality, a series of displayed features operating as buttons can be implemented for hiding a displayed VOR from view (i.e. making it "invisible"), when the user wants to view the first image without the input region of the VOR, and for exposing a previously hidden VOR. The method may also support an irregularly shaped VOR, with the operating buttons associated with either the input region, the output region, both regions or at some distinct location, for drawing a new shape and adding or subtracting it to the VOR as currently shaped.

There may also be such operating buttons for creating a VOR and associating it with its desired functionality using conventional menu techniques, and for deleting a VOR from the display area. Through these operations a VOR can be created having at least one explicit input region and at least one explicit output region separated from, but linked to, the input region.

The discussion which follows provides a description of an illustrated embodiment of a graphical object implementation according to the subject invention. Described is the system environment for the user interface implementation. It is to be appreciated that this material is set forth as one embodiment of the method according to the present invention. This discussion is similar to that set forth in Ser. No. 08/096,521, incorporated by reference, under the entitled section, "Description of an Illustrated Embodiment of a Graphical Object Implementation." For convenience of the reader, the numerical designations have, where possible, been maintained with those of the incorporated application to improve reference to that application.

A current embodiment of the method of the present invention has been implemented as a set of interactive user-controlled functions, or viewing operations, cooperating with the functionality of a graphical object editor application software program which operates in a graphical user interface system environment. Each viewing operation operates on the object-based model data structure of the graphical objects editor, hereafter called the graphical editor data structure, which has structural features similar to model data structure described earlier (This material has been fully detailed in U.S. Ser. No. 08/096,521, incorporated herein). The implementation of one of these viewing operations, designated as method, or viewing operation, 400, will be described in detail below. The structure of this programming environment will be described with reference to the simplified functional block diagram of FIG. 14 with the understanding that these functional components are common to a wide variety of machines supporting graphical user interface environments.

The illustrated embodiment has been implemented on a Sun Microsystems SPARCstation 10 computer as a research software prototype application written in the Cedar programming environment, a Xerox proprietary research software environment, utilizing the Cedar programming language, and running on the SunOS UNIX-compatible operating system. The Cedar programming environment provides application support for a graphical user interface environment including software functions both for presenting and managing images for display in plural workspaces or "windows" in the display area of the display, and for interfacing with at least one pointing device, to be manipulated by a user of the machine. The user uses the pointing device to communicate operational commands to the graphical user interface, and, through the interface, to each software application operating in each window.

The illustrated implementation also operates within the framework of an editing environment known as MMM (Multi-Device Multi-User Multi-Editor). MMM operates as a single window in the Cedar programming environment, and allows for multiple applications, including the graphics editor application, to execute as subwindows within the MMM window. MMM takes events from multiple input devices, such as a mouse and a trackball, keeps track of which device produced which event, and places all events on a single queue. It dequeues each event in order and determines to which application that event should be delivered. MMM applications are arranged in a hierarchy that indicates how they are nested on the screen. Each event is passed to the root application, which may pass the event on to one of its child applications, which may in turn pass the event on down the tree. Mouse events are generally delivered to the most deeply nested application whose screen region contains the mouse coordinates. However, when the user is dragging or resizing an object in a particular application, all mouse coordinates go to that application until the dragging or resizing is completed. Keyboard events go to the currently selected application. Additional information about the MMM environment may be found in Eric A. Bier and Steve Freeman, "MMM: A User Interface Architecture for Shared Editors on a Single Screen" in the Proceedings of the ACM SIGGRAPH Symposium on User Interface Software and Technology (Hilton Head, S.C. Nov. 11–13, 1991), ACM, New York, 1991, at pp 79–86.

In the illustrated implementation, the MMM editor is the root application and its window contains all other relevant application windows. In this case, those other applications include viewing operation 400 and Gargoyle graphics editor 120. MMM thus acts as a signal director between viewing operation 400 and application 120. In the illustrated implementation, viewing operation 400 is one of several tools that may be placed on a transparent overlay. The use of viewing of operation 400 in conjunction with the transparent overlay is described in more detail in concurrently filed, copending, and commonly assigned U.S. patent application Ser. No. 08/096,521 entitled "User Interface Having Movable Sheet with Click-Through Tools". For purposes of describing the illustrated embodiment herein, the processing interconnections between the viewing operation 400 and the transparent overlay are not significant and will not be discussed.

In addition, for simplification, the functionality of the MMM environment will be presumed to be incorporated directly into the window management system 112, and references to the "window manager 112" hereafter will presume to include the functionality of the MMM editor in the illustrated implementation.

Figure 14:
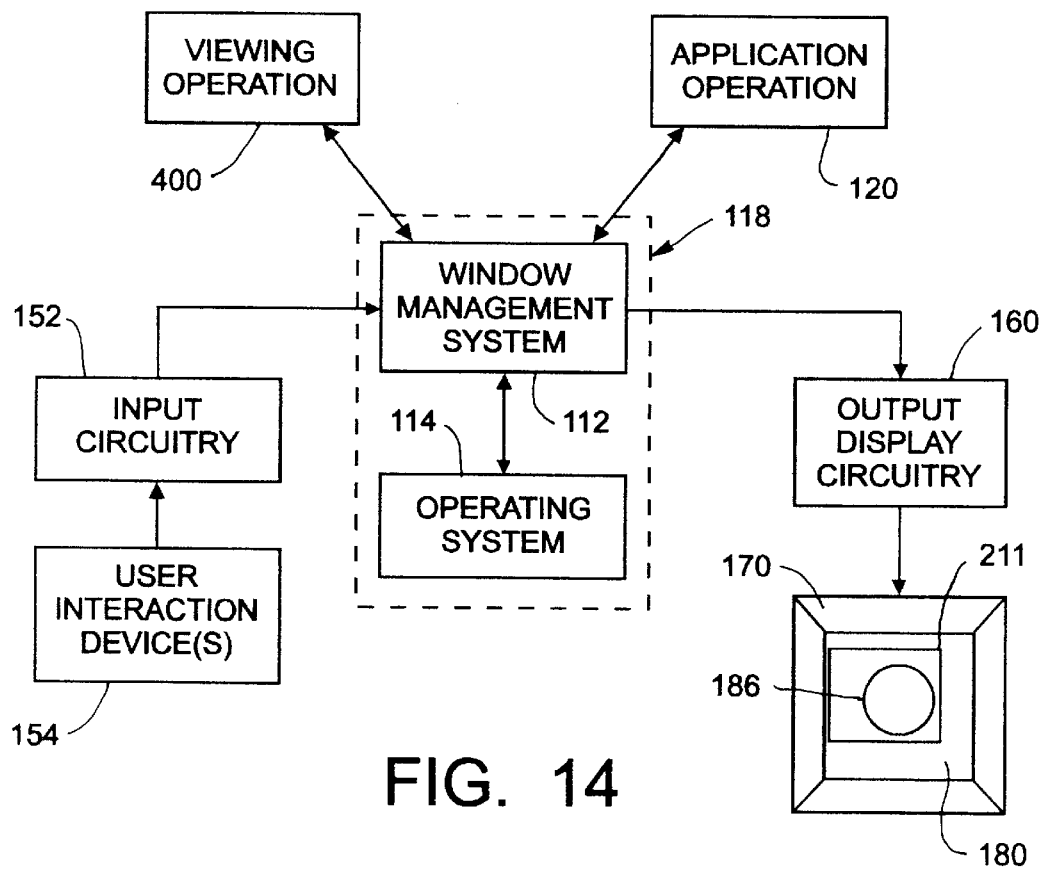
FIG. 14 is a block diagram illustrating the interaction between the components of an illustrated embodiment of the method of the present invention; and, FIG. 14A is a variation of the block diagram in FIG. 14 illustrating an alternative implementation of the method of the present invention.

The underlying structure of the Cedar environment, designated collectively as reference numeral 118 in FIG. 14, is a collection of components, including window management system 112 and operating system 114, that are arranged in hierarchical layers, supporting a well integrated, interactive environment in which lower level modules remain directly available to higher level, or "client" programs, callable as ordinary Cedar language procedures. In addition, a higher level Cedar component can supply a procedure value as a parameter to a lower level service procedure, which in turn can later invoke the higher level component to communicate with it as necessary.

Cedar environment 118 controls different application contexts controlled by a processor (see for example processor 140 of FIG. 46 and related discussion in U.S. Ser. No. 08/096,521, incorporated by reference) by separating them physically into different parts of one or more display screens. Application programs, such as the Gargoyle graphics editor 120, in the Cedar programming environment are called "clients" of the environment. The Cedar environment includes a high-level software window management system 112, hereafter called "window manager 112", which provides the necessary window management control for the application client programs that execute on the machine. Window manager 112 allows programmers and programs to create, destroy, move, and realize a hierarchical system of defined individual viewing areas in display area 180 of display device 170 called "windows". Each window is a region whose position and size is managed by the window manager 112, but whose contents are determined by the client application which creates the window. Window manager 112 also permits the client application to create nested subwindows to handle certain lower level functions within top level windows. Window manager 112 redisplays the contents of each window based on client-supplied specifications whenever the window's contents, size, or location changes. Windows are implemented by a client application as a set of window classes. A window class implementation provides operations to initialize a window, to save its contents, to destroy a window, to paint its contents on the display, and so on, and each member of a specific window class shares these same behaviors.

Viewing operation software 400 contains the software instructions for defining and implementing a viewing operation according to the method of the present invention and for interacting with the graphical editor data structure used by Gargoyle graphics editor 120 in order to produce the second image. Viewing operation 400 cooperatively interacts with the functionality of the Gargoyle graphics editor 120, and is a client of window manager 112, as is Gargoyle graphics editor 120. Each application client exchanges data with user interaction device 154 and display 170, via window manager 112 and output display circuitry 160, by converting signals received from input circuitry 152 into a series of user input signals for directing control of a processor (see for example processor 140 FIG. 46 and related discussion in U.S. Ser. No. 08/095,598, now U.S. Pat No. 5,581,670, incorporated by reference) to perform the operations of Gargoyle graphics editor 120 and to perform viewing operation 400, including creating and drawing the viewing operation region, VOR, 186 in window 211, on display 170, in response to request signals from the user.

The Cedar programming environment also includes a high-level, device independent graphics software application known as the Imager that provides high quality two-dimensional display of text, line art, and scanned images. The imaging model for the Imager is based on the Interpress page description language, which is similar to PostScript. The Imager handles all display output for all applications, including window manager 112, as well as for other programs (not shown) implemented in the Cedar environment. The Imager supports the presentation of a variety of image material: text in various fonts, lines and curves of various thickness, strokes or enclosed outlines, sampled images, and various color models. Image transformations can scale, rotate, translate, and clip images through simple specifications. The device's independent design permits images to be rendered on a variety of devices, some of which include full-color displays, color-mapped displays, black and white displays, and printers.

In the illustrated embodiment, window manager 112 includes input handler software (not shown) which collects, interprets, and parses the input data stream of user input requests and data into appropriate input signals for further action. Two modes of input handling are provided by window manager 112. In one mode, input signal management produces a single serial buffer of time-stamped input events from supported input devices, which in turn may be independently extracted by an application client if needed for processing a particular user event or response. In the second mode, called the Terminal Input Processor (TIP), input signals are interpreted based on specifications that are parsed into TIP tables (not shown). For each event, or event sequence, a TIP table entry specifies a sequence of action tokens that represent the semantics of the event. In the MMM framework of the illustrated embodiment, the functionality of the TIP is handled in MMM, and Cedar's TIP is not used.

In the illustrated embodiments, a three-button mouse provides the primary method for a user to send signals to viewing operation 400 requesting the display of the VOR 186. The mouse is connected in a conventional manner to user input circuitry 152. However, user interaction device 154 may include any suitable device for interacting with the viewing operation region 186 and other objects displayed on display device 170, including but not limited to pointing and cursor control devices for two and three-dimensional displays, such as a light pen, track ball, joystick, or data glove device, a touch screen display, and alphanumeric devices such as a keyboard. Alternatively, the user interaction device 154 may be a speech recognition device for speaking input, or a location sensing device for gestural input.

Additional information regarding the Cedar programming environment may be found in D. Swinehart, et al., "A Structural view of the Cedar Programming Environment", ACM Transactions on Programming Languages and Systems, Vol. 8, No. 4, October 1986, pp 419–490, and in W. Teitelman, "A Tour Through Cedar", IEEE Software, Volume 1, No. 2, April, 1984, pp. 44–73, both of which are hereby incorporated by reference herein. Additional information regarding the Gargoyle graphics editor may be found in K. Pier et al., "An Introduction to Gargoyle: An Interactive Illustration Tool", Proceedings of the Intl. Conf. on Electronic Publishing, Document Manipulation and Typography, (Nice France, April) Cambridge University Press, 1988, pp. 223–238, which is also hereby incorporated by reference herein.

Figure 14A:
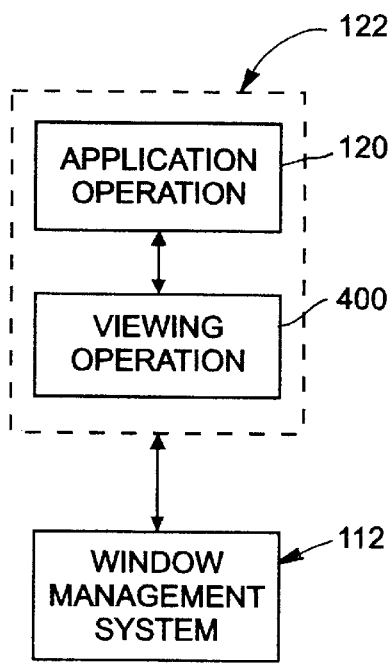

In the illustrated embodiment, method 400 is implemented as a separate application, and the MMM editor handles any interaction between application 120 and method 400. However, as shown in FIG. 14A, the method of the present invention may also be implemented as a functional enhancement to application 120 which interacts with window management system 112 in graphical user interface environment 118 as collective entity 122. Method 400 may be implemented in this manner to operate in any of the variety of graphical user interfaces currently available for computer workstations and other types of machines having processors and displays, including personal computers, fully-featured copier-duplicators, production publishing machines, and image reproduction machines. The method of the present invention may be implemented in a variety of hardware and software environments that provide the window management and graphics software support functions equivalent to those described herein with respect to the illustrated embodiment.

It is therefore evident that there has been provided in accordance with the present invention, a method of operating a machine, as well as a machine, that fully satisfy the aims and advantages set forth herein. While this invention has been described in conjunction with specific embodiments, many alternatives, modifications and variations will be apparent to those skilled in the art. The specific embodiments illustrated and discussed herein are by no means exhaustive of all possible categories and instances of method implementations, and the invention as herein described is intended to embrace all such alternatives, modifications and variations as fall within the scope of the appended claims.

What is claimed:

1. A method of operating a machine which includes, a signal source for producing signals indicating image display requests;

output circuitry connected to an output utilization device; the output utilization device producing human perceptible output; the output utilization device including a display having a display area for presenting images; the display area having a first image displayed in a present image position therein; the first image including a first display feature;

a processor connected for receiving the signals from the signal source, and connected for providing data defining human perceptible output to the output circuitry; and memory for storing data; the data stored in the memory including, instruction data indicating instructions the processor executes; and a first image model data structure including a first image data item; the first image being produced from the first image model data structure; the first display feature representing the first image data item;

the processor further being connected for accessing the data stored in the memory, the method of operating the machine comprising:

operating the processor to receive request signal data from the signal source; the request signal data indicating a display request to provide output producing region image data to the output circuitry connected to the display so that the display presents, in response to the output producing region image data, an output producing region image; the output producing region image showing an output producing region displayed in a viewing position in the display area spatially distanced from the present image position of a first image segment of the first image; the first image segment including the first display feature; and operating the processor to respond to the request signal data indicating the display request by producing output signal data defining human perceptible output using the first image data item from the first image model data structure; and providing the output signal defining the human perceptible output to the output circuitry connected to the output utilization device so that the output utilization device presents the human perceptible output in response to the display of the output producing region substantially at the same time as the first image is being displayed in the display area;

whereby presentation of the human perceptible output produced using the first image model data structure in response to the display request gives the perception to a machine user of providing information related to the first display feature in the first image segment in an area spatially distanced from an area where the first image segment is located.

2. The method according to claim 1 wherein the output producing region is a viewing operation region having an explicit input region and an explicit output region spatially distanced from the explicit input region, and wherein the act of operating the processor to produce the output signal data includes producing image definition data defining a second image for display in the explicit output region; and the act of operating the processor to provide the output signal data to the output circuitry connected to the output utilization device includes providing the image definition data defining the second image to the output circuitry connected to the display so that the display presents the second image in the explicit output region; the second image being presented in the explicit output region substantially at the same time as the first image segment is displayed in the input region;

whereby the second image in the explicit output region is spatially distanced from the first image segment in the input region.

3. The method according to claim 2 wherein, the act of operating the processor includes producing the second image having size and shape dimensions different from size and shape dimensions of the explicit input region.

4. The method according to claim 2 further comprising visually linking the explicit input region and spatially distanced explicit output region.

5. The method according to claim 2 wherein the input region is comprised of more than one defined region.

6. The method according to claim 2 wherein the output region is comprised of more than one defined region.

7. The method according to claim 4 further comprising, visually linking the explicit input region to the explicit output region by color coding.

8. The method according to claim 4 further comprising visually linking the explicit input region to the explicit output region by geometric similarities.

9. The method according to claim 2 further comprising, producing the explicit input region as a single region and the output region as a plurality of regions.

10. The method according to claim 2 further comprising, producing the explicit input region as a plurality of regions and the explicit output region as a single region.

11. The method according to claim 2 further comprising, detecting when the explicit output region is at a predetermined position of the display area; and adjusting a location of the explicit output region relative to the explicit input region when the predetermined position is detected.

12. The method according to claim 2 further comprising, resizing the explicit input region; and in response to resizing the explicit input region, resizing the explicit output region.

13. The method according to claim 2 further comprising, resizing the explicit output region; and in response to resizing the explicit output region, resizing the explicit input region.

14. A method of operating a machine which includes, input circuitry connected to a user input device; the input circuitry receiving signals indicating requests of a machine user;

output circuitry connected to a display having a display area for presenting images; the display area having a first image displayed in a present image position therein;

a processor connected for receiving the signals from the input circuitry, and connected for providing image definition data defining images to the output circuitry; and memory for storing data; the data stored in the memory including, instruction data indicating instructions the processor executes; and a first image model data structure; the first image being produced from the first image model data structure;

the processor further being connected for accessing the data stored in the memory, the method of operating the machine comprising:

operating the processor to receive request signal data from the input circuitry indicating a display request by the machine user to display a viewing operation region including an explicit input region and a spatially distanced explicit output region, the input region being in a present viewing position in the display area coextensive with the present image position of a first image segment of the first image; the viewing operation region having a viewing operation associated therewith for mapping the first image model data structure to image definition data defining a second image for display in the explicit output region; and operating the processor to respond to the request signal data indicating the display request by producing image definition data defining the second image according to the viewing operation using the first image model data structure; and providing the image definition data defining the second image to the output circuitry connected to the display so that the display presents the second image in the explicit output region in response to the image definition data; the second image being displayed substantially at the same time as the first image is displayed in the explicit input region;

whereby presenting the second image in the explicit output region in response to the display request by the machine user gives the perception to the machine user of producing a view of the first image segment within the explicit input region, spatially distinct from the explicit input region, according to the viewing operation associated with the viewing operation region.

15. The method according to claim 14 wherein:

the first image model data structure further includes a display feature attribute data item represented by the first display feature included in the first image; the display feature attribute data item having a present attribute value indicating the first display feature when displayed in the display area;

the method further comprising:

operating the processor to receive user signal data from the user input device; the user signal data indicating a movement action by the machine user moving the viewing operation region from the present viewing position in the display area to another viewing position coextensive with another image position of another image segment of the first image; the another image segment including the first display feature; and operating the processor to respond to the user signal data indicating movement of the viewing operation region by providing image definition data defining another second image to the display so that the display presents the another second image in the explicit output region of the viewing operation region in response to the image definition data; the another second image showing a modified first display feature representing a new attribute value for the display feature attribute data item included in the first model data structure;

whereby presentation in the output region of the modified first display feature included in the another second image gives the perception to a machine user of providing information related to the first display feature included in the another image segment in the explicit input region.

16. A machine comprising:

input circuitry connected to a user input device; the input circuitry receiving signals indicating requests of a machine user;

output circuitry connected to a display having a display area for presenting images; the display area having a first image displayed in a present image position therein;

a processor connected for receiving the signals from the input circuitry, and connected for providing image definition data defining images to the output circuitry for presentation by the display; and memory for storing data; the data stored in the memory including:

instruction data indicating instructions the processor can execute; and a first image model data structure; the first image being produced from the first image model data structure;

the processor being further connected for accessing the data stored in the memory;

the processor, in executing the instructions, receiving request signal data from the input circuitry indicating a display request by the machine user to display a viewing operation region including an explicit input region and an explicit output region spatially distanced from the explicit input region, the explicit input region displayed in the present viewing position in the display area coextensive with the present image position of a first image segment of the first image;

the processor further, in executing the instructions, responding to the request signal data indicating the display request by producing image definition data defining a second image in the explicit output region using the first image model data structure; and the processor further, in executing the instructions, providing the image definition data defining the second image to the output circuitry connected to the display so that the display presents the second image in the explicit output region in response to the image definition data; the second image being displayed substantially at the same time as the first image is displayed in the display area;

whereby the processor, in executing the instructions, causes the presentation of the second image in the explicit output region and gives the perception to a machine user of providing information related to the first display feature in the first image segment of the explicit input region.

* * * * *